US006215122B1

(12) United States Patent
Clifford et al.

(10) Patent No.: US 6,215,122 B1
(45) Date of Patent: Apr. 10, 2001

(54) METHOD FOR HIGH SPEED PULSE PILE-UP REJECTION

(75) Inventors: E. T. H. Clifford, Deep River; Barclay Selkirk, Greenspond; Harry Ing, Deep River, all of (CA)

(73) Assignee: Her Majesty the Queen in right of Canada, as represented by the Minister of National Defence, Ottawa (CA)

(*) Notice: Subject to any disclaimer, the term of this patent is extended or adjusted under 35 U.S.C. 154(b) by 0 days.

(21) Appl. No.: 09/268,354

(22) Filed: Mar. 16, 1999

Related U.S. Application Data

(62) Division of application No. 09/054,397, filed on Apr. 3, 1998, now Pat. No. 6,026,135.
(60) Provisional application No. 60/041,929, filed on Apr. 4, 1997.

(51) Int. Cl.[7] ................................................. G01T 1/208
(52) U.S. Cl. ............................ 250/369; 250/362; 702/74
(58) Field of Search ............................... 250/369, 362, 250/395, 363.07, 363.09; 702/66, 74, 85

(56) References Cited

U.S. PATENT DOCUMENTS

| 3,984,689 | 10/1976 | Arseneau . |
| 4,486,663 | 12/1984 | Arseneau . |
| 4,535,242 | 8/1985 | Dirkse et al. . |
| 4,968,898 | 11/1990 | Hushimi et al. . |
| 5,210,423 | 5/1993 | Arseneau . |
| 5,307,272 | 4/1994 | Butler et al. . |

FOREIGN PATENT DOCUMENTS 2174496    2/1999   (CA) .

OTHER PUBLICATIONS

"The Detection Of Buried Explosive Objects", McFee et al., Can. J. Remote Sensing 6, p. 104, Dec. 1980.
"Advances In The Location And Identification Of Hidden Explosive Munitions (U)", McFee et al., Suffield Report 548, Feb. 1991. Unclassified.
"Crad Countermine R&D Study—Final Report (U)", McFee et al., Suffield Special Publication 174, Apr. 1994. Unclassified.
"IR Contrast Prediction Of Shallowly Buried Objects By Characterizing The Temperature Gradient Into The Soil", Simard, Patent Disclosure, Jan. 24, 1996.
"Fused Airborne Sensor Technology", Summey et al., Proc. SPIE Conference on Detection and Remediation Technologies for Mines and Mine–like Targets, vol. 2765, Orlando, Fl, USA, Apr. 9–12, 1996, pp. 226–232.

(List continued on next page.)

Primary Examiner—Seungsook Ham
Assistant Examiner—Richard Hanig
(74) Attorney, Agent, or Firm—Larson & Taylor, PLC

(57) ABSTRACT

A process for identifying and rejecting pile-up pulses in a system is provided. Preferably, the process is applied to mine detection where time is at a premium. A thermal neutron activator sensor (TNA) trails a mine-detecting vehicle and is dwells over the coordinates of a target of interest for a short a time as possible. The TNA interrogates the object with slow neutrons, the required time being brief due to the use of a strong source coupled with a the process for analyzing the resultant high number and rate of pulses and rejecting piled-up pulses. Specifically, low energy pulses are removed and the remaining pulse is analyzed for its shape in comparison to the known shape of a non-piled-up pulse. The pulse is integrated using a gated integrator between a designated portion the pulse and for the whole pulse. For a normal pulse, the difference between the two integrations produces a repeatable baseline which is zeroed out to a null difference. Thus any non-zero difference is illustrative of a piled-up pulse which can be rejected, thereby maintaining high count rates while continuing to distinguish and count nitrogen-related events indicative of explosives.

12 Claims, 13 Drawing Sheets

OTHER PUBLICATIONS

"Multisensor Application For Mines And Minelike Target Detection In The Operational Environment", Hanshaw, Proc. SPIE Conference on Detection and Remediation Technologies for Mines and Mine–like Targets, vol. 2765, Orlando, FL, USA, Apr. 9–12, 1996, pp. 249–258.

"A Multisensor System For Mine Detection", Garriott et al., Proc. SPIE Conference on Detection and Remediation Technologies for Mines and Mine–like Targets, vol. 2765, Orlando, FL, USA, Apr. 9–12, 1996, pp. 259–268.

"IGMMDT: A Multisensor Approach To Mine Detection", Gorman, Proc. SPIE Conference on Detection and Remediation Technologies for Mines and Mine–like Targets, vol. 2765, Orlando, FL, USA, Apr. 9–12, 1996, pp. 269–274.

"Multisensor Fusion For The Detection Of Mines And Minelike Targets", Hanshaw, Proc. SPIE Conference on Detection Technologies for Mines and Mine–like Targets, vol. 2496, Orlando, FL, USA, Apr. 17–21, 1995, pp. 152–158.

"Model–Based Sensor Fusion For Minefield Detection", Bargel et al., Proc. SPIE Conference on Detection Technologies for Mines and Mine–like Targets, vol. 2496, Orlando, FL, USA, Apr. 17–21, 1995, pp. 509–518.

METHOD FOR HIGH SPEED PULSE PILE-UP REJECTION

CROSS REFERENCE TO RELATED APPLICATION

This is a division of the parent application Ser. No. 09/054,397, filed Apr. 3, 1998. Now U.S. Pat. No. 6,026,135 which also claims the benefit of Provisional Application 60/041,929 filed Apr. 4, 1997. Reference numerals used in the parent application have been retained herein for cross-reference consistency.

FIELD OF THE INVENTION

The invention relates to the use of a thermal neutron activation sensor for the detection or confirmation of an object as a mine, more particularly to application of a high rate pulse pileup rejection process.

BACKGROUND OF THE INVENTION

Much effort has been expended in area of ground-based detection of mines. While a number of technologies have been applied to the task, each is particular to the type of mine, the terrain, or the time pressures for detection, i.e. during the stress of combat or during peace time. There is an objective to obtain the highest probability of detection (Pd) and the lowest false alarm rate (FAR). Further, there is the objective cover ground at a high rate of speed which equates to clearance of mines at a faster rate.

Conventional methods include hand-held, ground based vehicle-mounted or airborne detectors. Vehicle-mounted detectors have a high ground speed and hand-held detectors are intended for places that vehicle-mounted detectors cannot reach. The hand-held detectors have a slow ground speed. Airborne detectors are fast but are designed for gross detection of minefields and as such generally have a lower Pd and higher FAR than the other two methods.

The prior art detection apparatus and methodology have employed a variety of different single sensor technologies, including electromagnetic induction, magnetometers, impedance measurements, ground probing radar, millimeter and microwave radiometry, optical and infrared imaging (IR), ultraviolet, acoustics, various nuclear methods, trace gas detection, biodetection, and mechanical probes.

Some hand-held sensors using electromagnetic induction detectors, achieve a desirably high Pd for metallic mines but can be associated with a high FAR, i.e. detecting metallic debris which are not mines. The applicants are not aware of hand-held detectors that can reliably detect nonmetallic mines.

Thermal Neutron Activation (TNA) is another known sensor technology for detection and relative quantification of nitrogen in nitrogen-based explosives. A long standing known application is the use of TNA for detection of explosives in baggage. Applicants are also aware of application of TNA applied to continuously moving mine-detection vehicles for dynamically detecting mines. It is applicant's understanding that this moving application has been unsuccessful thus far due to the incompatibility of covering ground relatively quickly and collecting sufficient gamma rays to reliably assess the nitrogen content of an object.

Prior art attempts have been attempted to assess the data from combinations of IR, radar and metal detectors. "Data Fusion" is known which combines and analyses a plurality of sensor data as a whole. In conventional information-analysis systems, individual data from each sensor is weighted or compared to a threshold, then combined for improving decision-making. One disadvantage with data fusion alone is that despite the potential for improved detection probabilities, there is also a greater likelihood of greater false positive detections.

For ground-based, vehicle-mounted mine detection, the majority of prior art systems are single sensor systems using electromagnetic induction (EMI) or ground penetrating radar (GPR). Known combinations of sensors include using forward-looking IR (FLIR) cameras, EMI arrays and GPR. To date, applicant's believe that data from each sensor has been presented separately to an operator who has had the very difficult task of sorting out the simultaneous information or a combination of sensors merely improves the likelihood of identifying potential hazardous objects In short, the prior art teaches:
- ground-based, vehicle-mounted sensors for detecting mines;
- use of multiple mine detecting sensors on one vehicle;
- data fusion techniques for combining the data from multiple sensors generally for improving the probability of detection; and
- use of massive TNA sensors for baggage interrogation or for detection under moving, short time duration sensing.

There is a demonstrated need for a system which will traverse the ground at a reasonable rate and rather than being able to suggest that the object is likely a mine, a system which will substantially confirming whether a detected object is a mine or not.

Thermal Neutron Activation (TNA) is known for inspecting baggage for the presence of nitrogen, a known constituent of explosives. Generally, a target of interest, such as baggage, is exposed to thermal (slow) neutrons. A reaction between the thermal neutrons and nitrogen-14 causes emission of gamma rays. The emitted gamma rays are captured, counted and processed with electronics to determine the presence or concentration of nitrogen.

To count the gamma rays, events detected by a scintillation crystal are converted to an output signal containing serial pulses. High energy pulses are sought as being indicative of the presence of nitrogen. Low energy pulses are ignored (by applying a threshold or fast discriminator). Unfortunately, as the rate of pulses increases, such as is the result of using a high strength source and a close target, low energy pulses can be too closely spaced in time and pile-up upon each other. The apparent energy of the low energy piled-up pulses can exceed the detection threshold and be incorrectly interpreted as a high energy pulse representing nitrogen. Methods are successfully practiced to reject such pileup at counting rates of upwards of 200,000 counts per second (cps).

Low efficiency detectors such as Germanium (Ge) directly generate pulses having a shape which can be processed with conventional amplifiers at count rates in the 200,000–400,000 cps. To use Germanium detectors would require use of very high strength sources or many detectors—the costs being 10 to 20 time greater than using Sodium Iodide. Further, the Germanium units require cryogenics. High efficiency detectors such as a Sodium Iodide detector (NaI) can use a lower strength source, but the detector collects and output pulses having a shape which is subject to greater incidences of pile-up. Applicant is not aware of amplifiers or methods for rejecting pile-up at count rates from NaI detectors of over 200,000 cps.

Should an object be deemed to be a mine, it needs to be marked for subsequent neutralization, usually by digging it out of the ground. The existing line marking and other spray paint means are substantially mass-less, are difficult to place on ground and are only visible if viewed substantially straight on. Further, paints and the like are usually associated with toxicity and are semi-permanent. There is opportunity and a need for a temporary, environmentally friendly and highly visible marking scheme.

SUMMARY OF THE INVENTION

A plurality of sensors are provided, mounted to a vehicle for the sensing, identification and marking of mines for subsequent clearance. A plurality of sensors lead the vehicle to identify targets of interest and a trailing sensor confirms whether the identified target is a mine.

One aspect of the invention comprises implementation of a TNA sensor as a confirmatory sensor in contradistinction to the prior art explosive detectors which have traditionally used a large, expensive and technically complex TNA as a primary sensor. Used in combination with conventional sensors, a stationary, confirmatory TNA sensor can be applied with more specificity and thus can be smaller, yet provide faster confirmation. Implementation of a stationary TNA sensor in an otherwise moving system requires a particular and synergistic combination of features. The use of a confirmation sensor permits rapid identification of targets of interest and, even having a relatively slow confirmation step, ground can be traversed at a reasonable speed and with minimum false alarms.

In brief, the detection system comprises a moving vehicle to traverse the ground quickly having a plurality of sensors mounted to the vehicle and capable of identifying targets of interest while in motion; and a TNA which is connected to the vehicle yet which is operated only when the vehicle is stationary. Once the system determines the coordinates of the target of interest, the vehicle and TNA are manipulated in space so as to position the TNA.

The above system utilizes sensors which operate at acceptable ground speeds such as EMI, GPR and IR sensors. This rapid rate of coverage is necessarily interrupted by occasional stops to apply a non-moving sensor to confirm whether the detected object is explosive or not. A stationary TNA is utilized as the confirmation sensor. The time necessary to position the TNA over the object, and dwell there long enough to confirm whether an object is explosive or not, is a large part of the time budget. The dwell time is small however with respect to the time necessary to neutralize a confirmed mine afterwards.

It is advantageous to the throughput of the mine-detector vehicle to minimize the time necessary to acquire a sufficient number of gamma ray emission counts to confidently identify or reject an object as a mine. Use of existing TNA apparatus for detecting mines has resulted in count times numbered in hours. By increasing the source strength, the necessary numbers of counts are acquired in a shorter period of time. Further, to acquire a statistically useful number of counts, a high efficiency detector, such as that utilizing a Sodium Iodide crystal is used. Unfortunately, the resultant count rates are in the order or 200,000 to 500,000 per second and for Sodium Iodide detectors, pulse-pile up becomes excessive. Prior art pile-up pulse rejection methods are inadequate in these circumstances.

In summary, for minimizing dwell time, it is therefore desirable to use a strong neutron source (about 10× to 100× conventional for use with NaI detectors) placed as close as possible to the target of interest, and to use the high efficiency NaI detectors for reducing the time necessary to confirm a target of interest as being explosive. The resulting high count rates must accordingly be used in combination with means for rejecting pulse pile-up.

The solution to the pulse pile-up is to perform a pulse shape comparison. First, one eliminates the low energy pulses to lighten the processing load on the pile-up circuitry. Then, the pulse is analyzed for its shape in comparison to the known shape of a non-piled-up pulse. Preferably this is achieved by integrating the pulse, preferably using a gated integrator, between a designated portion the pulse (such as from its start to its middle, or its middle to its end) and for the whole pulse. The difference between the two integrations (portion and whole) should produce a repeatable baseline for pulses which haven't piled-up. More preferably, the baseline is zeroed out to a null difference and thus any non-zero difference is illustrative of a piled-up pulse. Accordingly, pulse issuing from NaI(Tl) detectors at rates of in excess of 200,000 cps can be analyzed and pile-up pulses rejected, thereby maintaining high count rates while continuing to distinguish and count nitrogen-related events.

DETAILED DESCRIPTION OF THE PREFERRED EMBODIMENT

Figure 1:
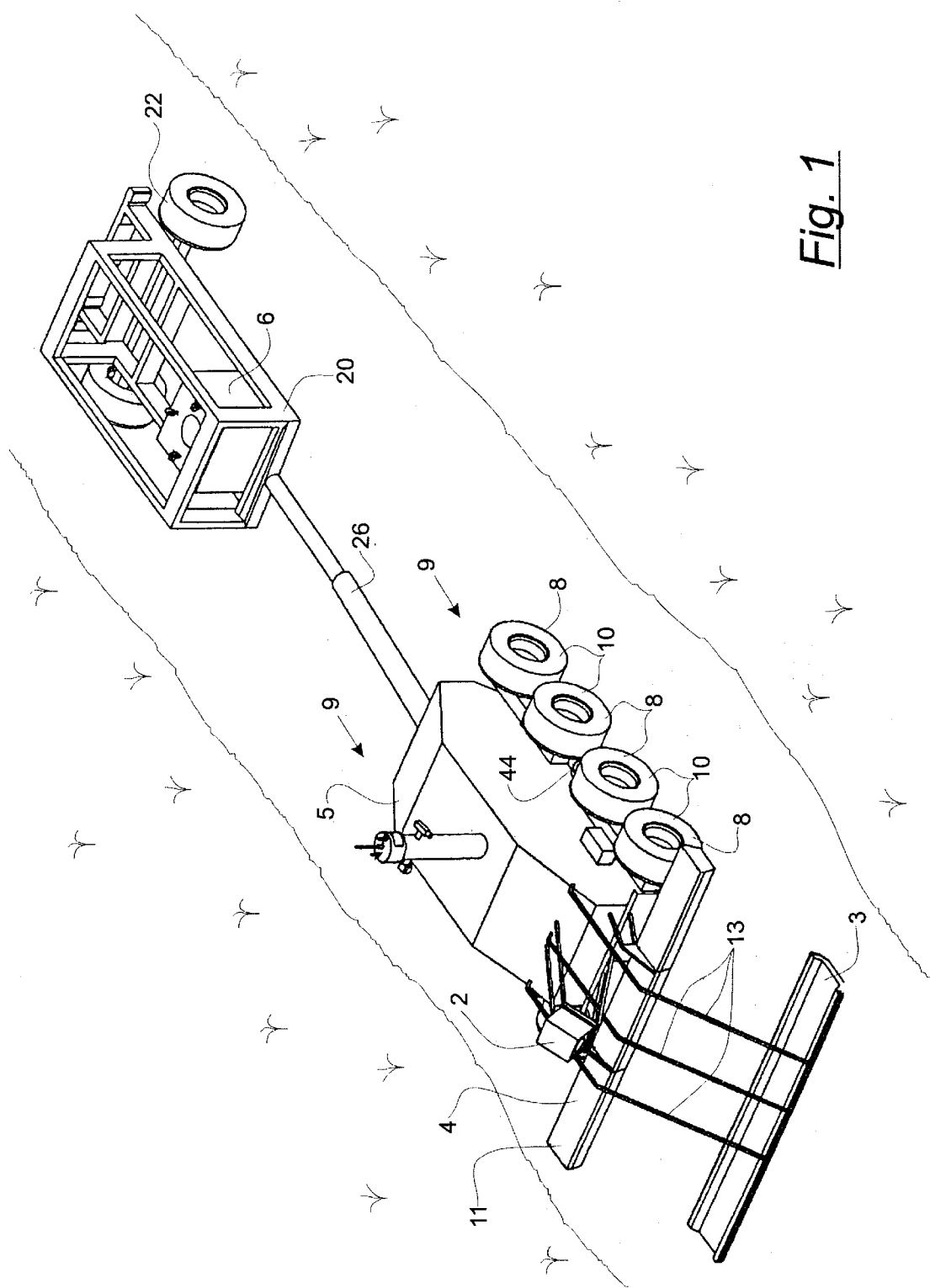
FIG. 1 is perspective view of the Multisensor Vehicle-Mounted Mine Detection system (MVMMD) sweeping a path while traversing the ground.

Having reference to FIG. 1, a multisensor vehicle-mounted mine detector 1 or MVMMD is provided comprising leading sensors 2,3,4, a remote-controlled detection vehicle (RDV), and a trailing sensor 6.

The three leading sweep sensors 2,3,4 are supported off of and lead the RDV 5 for sweeping a path. The leading sensors comprise a ground penetrating radar (GPR) 4, a metal detection electromagnetic induction sensor (EMI) 3, and an infrared scanning camera 2. The leading sensors 2,3,4 determine whether a detected object is a target of interest (TOI).

Figure 2:
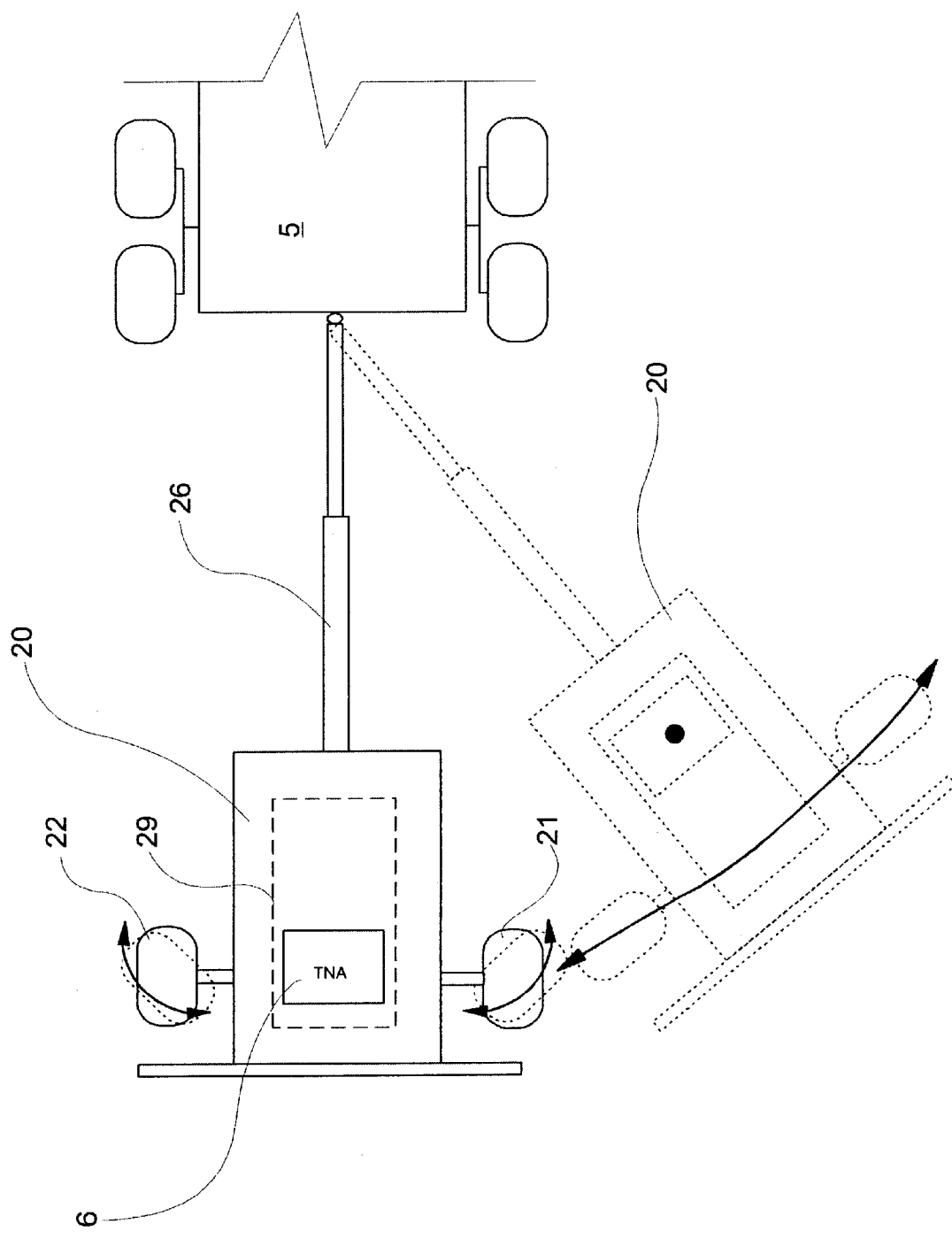
FIG. 2 is a schematic top view of the trailing sensor, more specifically a TNA in a trailer. The pivoting of the wheels and polar rotation of the trailer is illustrated between inline (solids lines) and rotated (phantom lines) positions.
Figure 3:
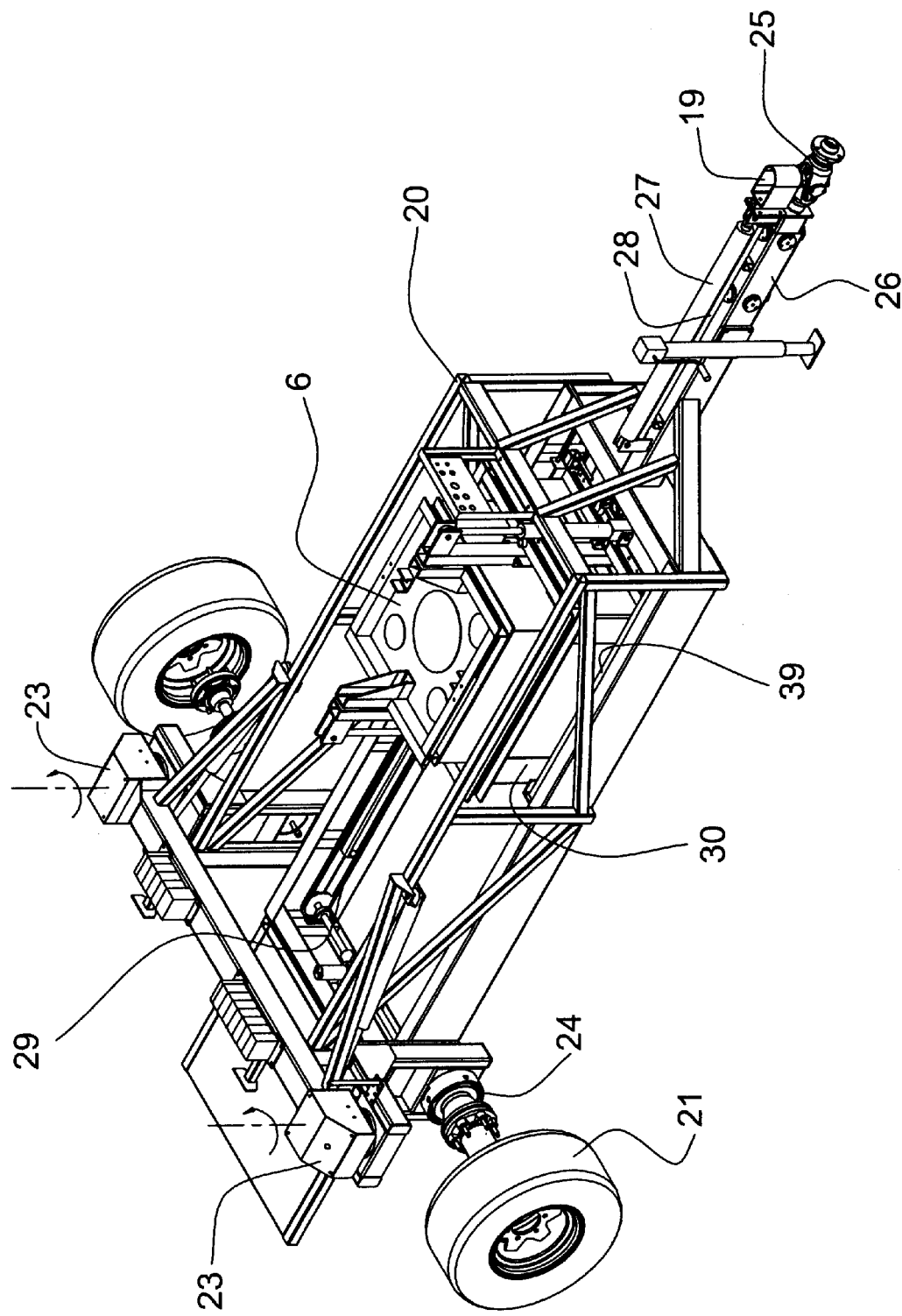
FIG. 3 is a perspective view of the TNA mounted in the trailing trailer. The wheels are shown in exploded view from the trailer to illustrate the drive motor and idler spindle.

Turning to FIGS. 1–4, the trailing sensor 6 confirms whether a TOI is a mine or not. Various devices are known such as chemical sniffers and thermal neutron activation sensors. In the preferred embodiment a thermal neutron activation sensor (TNA) 6 is towed behind the RDV 5. The custom TNA 6 is an inherently heavy sensor (about 270 kgs) and is supported in its own trailer 20 which distributes weight between the trailer 20 and the RDV 5 and thus and keeps the RDV ground pressure low. The trailer 20 is supported on two steerable wheels 21,22 which can be rotated about a vertical axis or pivot 23 to permit polar swinging action (FIG. 2). The trailer 20 is connected to the rear of RDV 5 with a hitch swivel 25 and a telescoping tongue 26. The hitch swivel 25 permits both polar movement and up and down rotation.

Figure 4:
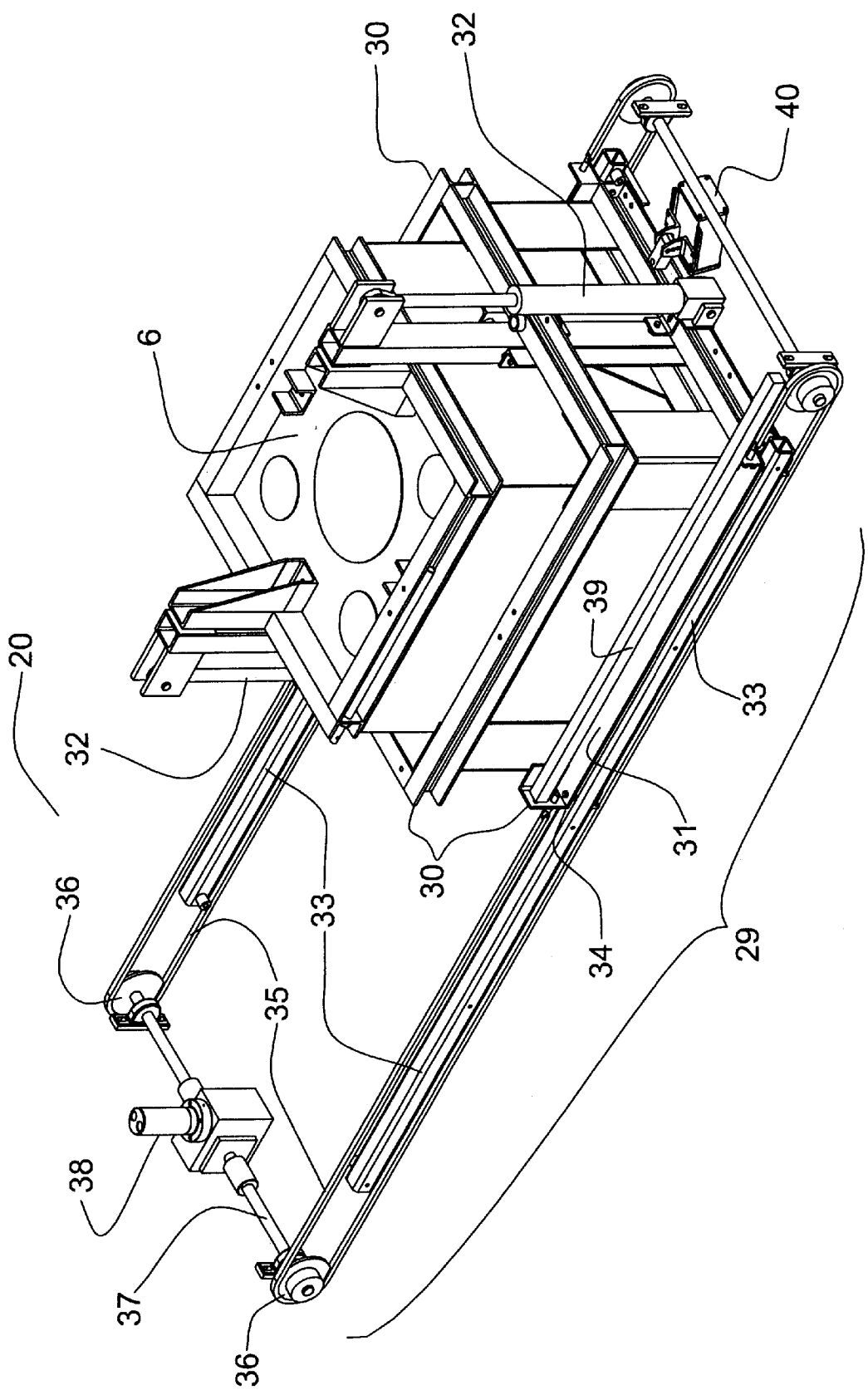
FIG. 4 is a perspective view of the trailer's gantry sub-assembly and TNA.

The TNA 6 itself is further suspended within a frame 29 on a radial gantry 29 within the trailer 20 (FIG. 4). The frame 30 is vertically positionable in the trailer 20 for positioning the TNA 6 as close to the ground as possible when sensing and for lifting the TNA for providing clearance during positioning.

Figure 5:
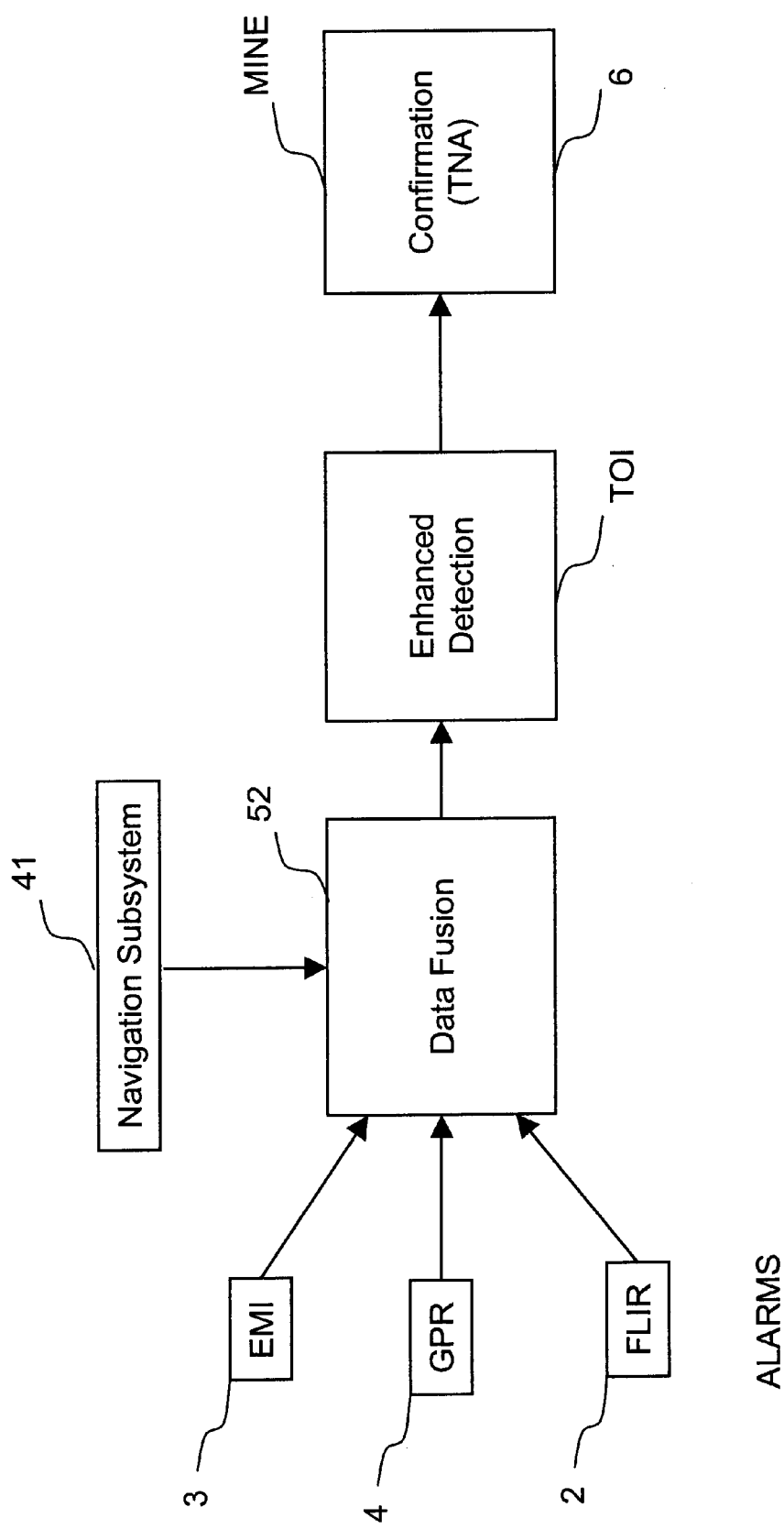
FIG. 5 is a block flow diagram of the relationship between the TNA, TNA processing electronics and vehicle control system.

Individually, the leading sensors 2,3,4 alarm at disturbances in the ground. As shown in FIG. 5, alarms from each of the leading sensors 2,3,4 are processed using data fusion for enhancing detection and identifying targets of interest (TOI). A TOI is tested by the TNA 6 for possible confirmation as a mine at the option of an operator.

The arrangement of three sensors 2,3,4, for sensing while moving, and a trailing confirmation sensor 6, for sensing while stationary, is an optimized arrangement. Spacing and placement of the sensors minimizes overall length of the MVMMD 1 while still providing an operator with sufficient lead time (minimum 3.5 meters) between the closest leading sensor 4 and the confirming TNA 6 for decision-making and for controlled deceleration of the MVMMD 1.

As discussed above, the ability to use TNA technology in a stationary confirmation role lifts restrictions on the design of a TNA apparatus, said prior art apparatus either having the luxury of long interrogation times or conversely being required to perform interrogation in a fraction of a second in a moving role. Either restriction is too onerous to provide a practical TNA sensor.

Figure 6:
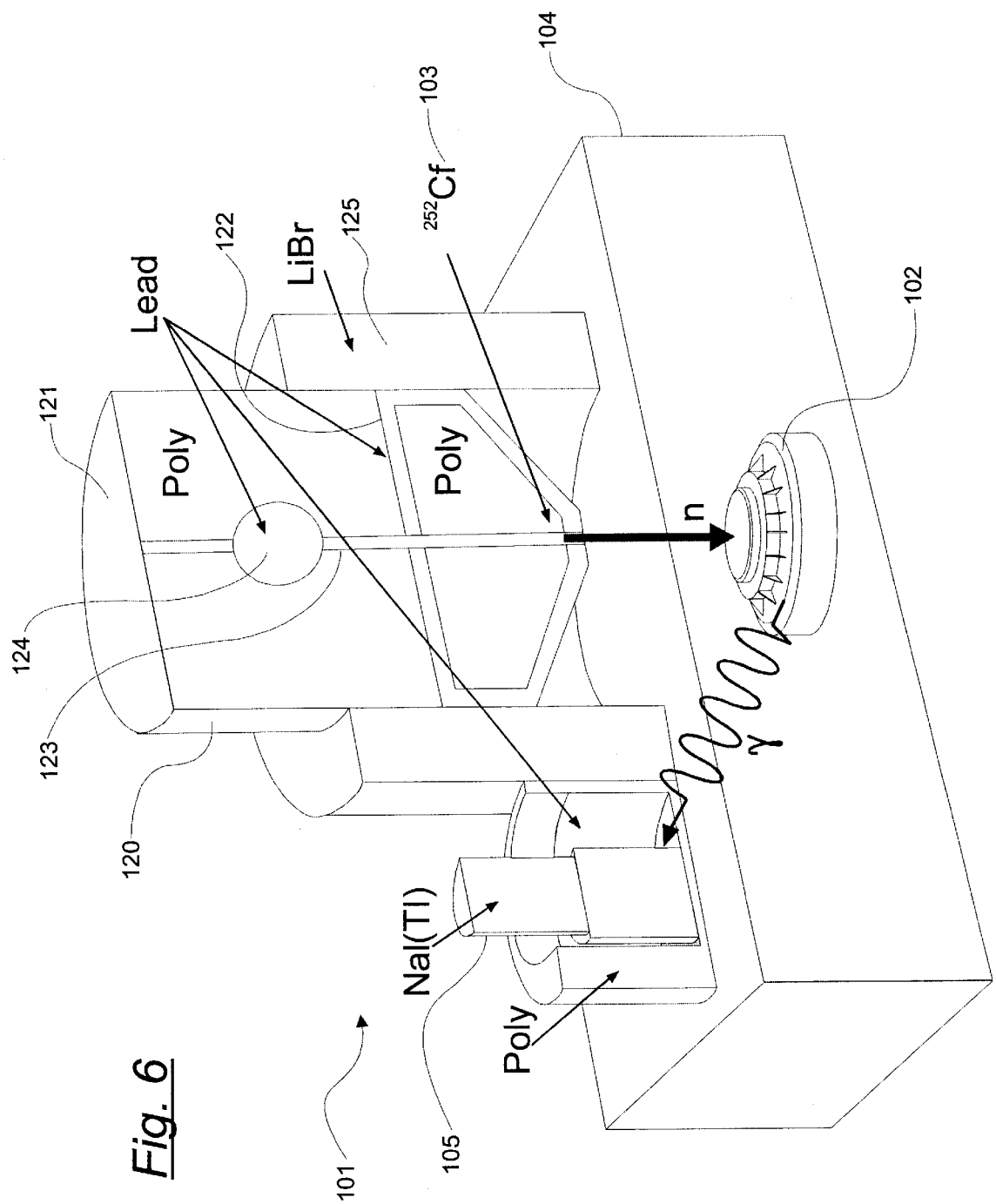
FIG. 6 is a cross-section view of the TNA sensor positioned above a mine. One of four detectors is shown and the shielding materials are identified.

Conversely, having reference to FIG. 6, a TNA sensor 101 is provided. The TNA sensor 101 can be placed accurately over a target of interest 102 (like a mine). Accordingly, the TNA sensor 101 can be strong enough to produce relatively short interrogation times, yet be made small, light (about 270 kgs) and at relatively low cost.

In particular, a TNA point confirmation sensor, model MineSCANS, was manufactured for the Department of National Defence by Science Applications International Corporation (SAIC Canada), Ottawa, Ontario.

The TNA sensor 101 comprises a 100 μg neutron source 103 of isotopic Californium ($^{252}$Cf) which emits energetic neutrons n which are slowed prior entering the ground 104 for reaction with nitrogen-14 nuclei ($^{14}$N). The $^{14}$N combine with the slow neutrons to form an energetic $^{15}$N isotope which decays, emitting a number of prompt gamma rays. The TNA sensor 101 is associated with a ground proximity sensor (not-shown) so that the TNA sensor 101 is not inadvertently lowered into contact with a potential mine 102.

For landmine detection, the most pertinent of these emissions of gamma rays is the highest energy transition at 10.835 MeV. At this transition energy there will be virtually no competing reactions—save for a weak 10.611 MeV transition from neutron capture in $^{30}$Si, common in most soils. Detection of this energy transition permits use of poor-resolution high efficiency Sodium Iodide NaI(Tl) scintillation cameras or detectors 105 as opposed to high-resolution cryogenically-cooled detectors (intrinsic Ge which have a lower detection efficiency).

The gamma rays impinge one or more detectors 105. As the gamma rays pass through the scintillation crystal —NaI (Tl) —they produce scintillation events—light. The events are detected by a photomultiplier tube 106 (not shown in FIG. 6). The signals produced by the photomultipliers 106 are combined into an output signal comprising serial pulses representing the scintillation events. The pulses are counted and are representative of the presence and concentration of $^{14}$N.

| | |
|---|---|
| Neutron Source Type | $^{252}$Cf |
| Neutron Source Intensity | 1 × 10$^8$ n/s |
| Gamma-ray Detector Type | 3" × 3" NaI(Tl) |
| Number of Detectors | 4 @ every 90° |
| Source-Detector Distance | 30 cm |
| Field of View | 60 cm diameter |

The strong source results in high returned gamma ray count rates. Sophisticated electronics are necessary to deal with observed count rates at the detectors at about 200,000 cps or greater.

Both the NaI(Tl) crystal and photomultiplier tube 106 are commercially-available, such from Teledyne-Brown and Hammamatsu respectively. The NaI(Tl) crystal and photomultiplier tube are preferably pre-qualified based upon their abilities to handle both the rates and high energies expected.

The detectors 105 are ruggedly mounted in a frame. For a marginal increasing in capture efficiency, each detector 105 is angled downward and inwardly (not shown), roughly converging in the ground 102 below the source 103.

Figure 7:
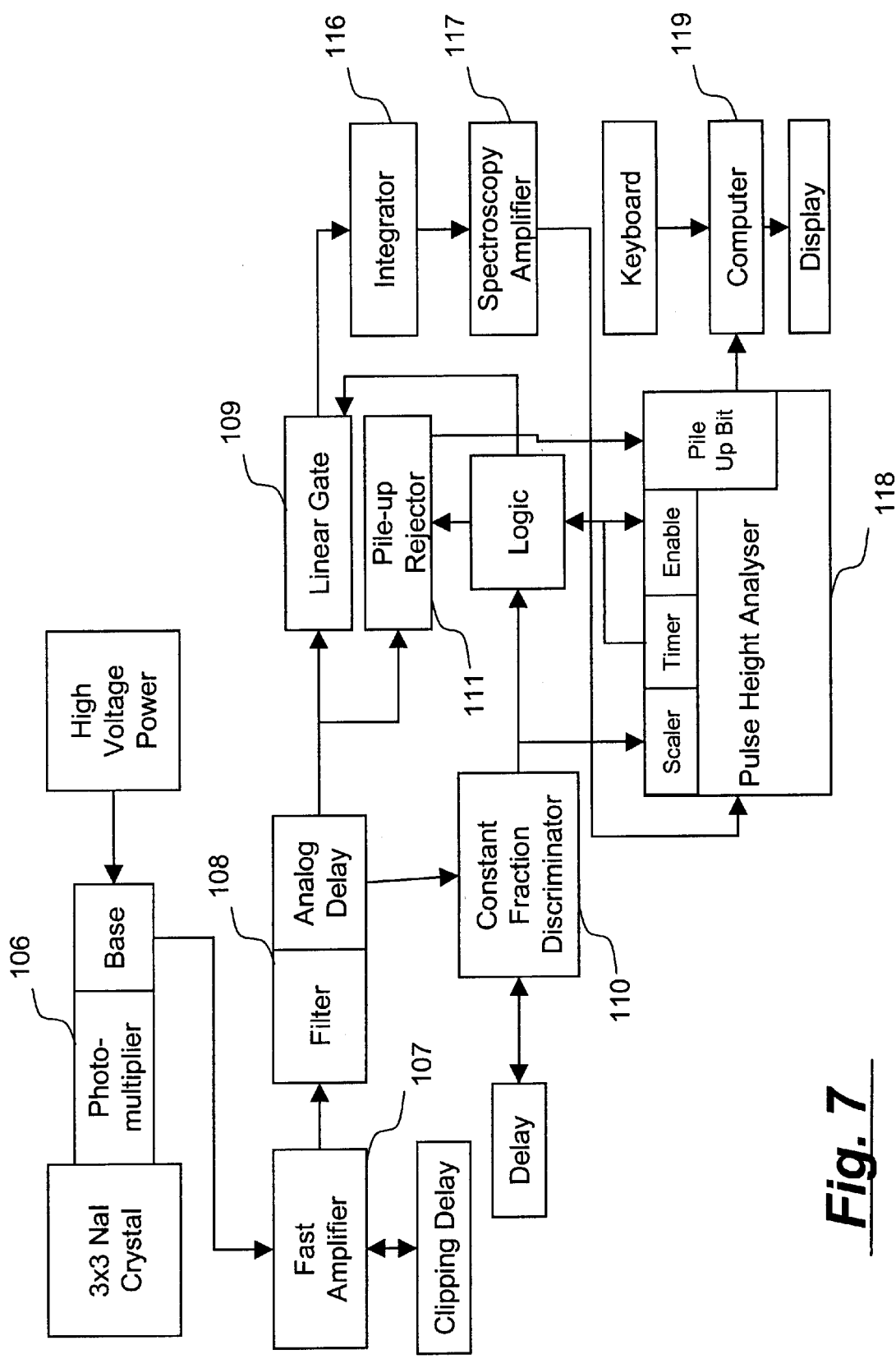
FIG. 7 is a block diagram of the electronics used for detecting and high speed processing of 10.8 MeV gamma rays associated with nitrogen.

Having reference to the schematic of FIG. 7, the photomultiplier 106 monitors the NaI(Tl) crystal for a visible event. The photomultiplier produces a signal with a pulse representing each event. The signal passes through an amplifier 107 (with a clipping delay) and a filter 108. The filter signal is delayed and then enters a fast linear gate 109, controlled by a constant fraction discriminator (CFD) 110 for reducing deadtime (where the processing electronics are unable to process one pulse before the next arrives). The CFD 110 has a threshold set to approximately 5 MeV. The combination of the linear gate 109 and CFD 110 lowers gamma ray pulse counting rates from about 200,000 to about 5,000 cps. The linear gate 109 is open for 160 ns for each accepted pulse. The counting rate while the gate 109 is open is still so high that adjacent low energy pulses can pile-up and pass the CFD 110 as a high energy pulse and be improperly counted as nitrogen-caused. This piled-up pulse must be identified and rejected.

Accordingly, a pile-up rejector circuit 111 is provided which utilizes a gated-integrator technique (FIG. 8) for rejecting pulses based upon shape distortion compared to "normal" pulses. Both pre and post pile-up events are detected. The technique is capable of detecting distortion in pulses as closely spaced as 15 ns and rejecting them.

Figure 8:
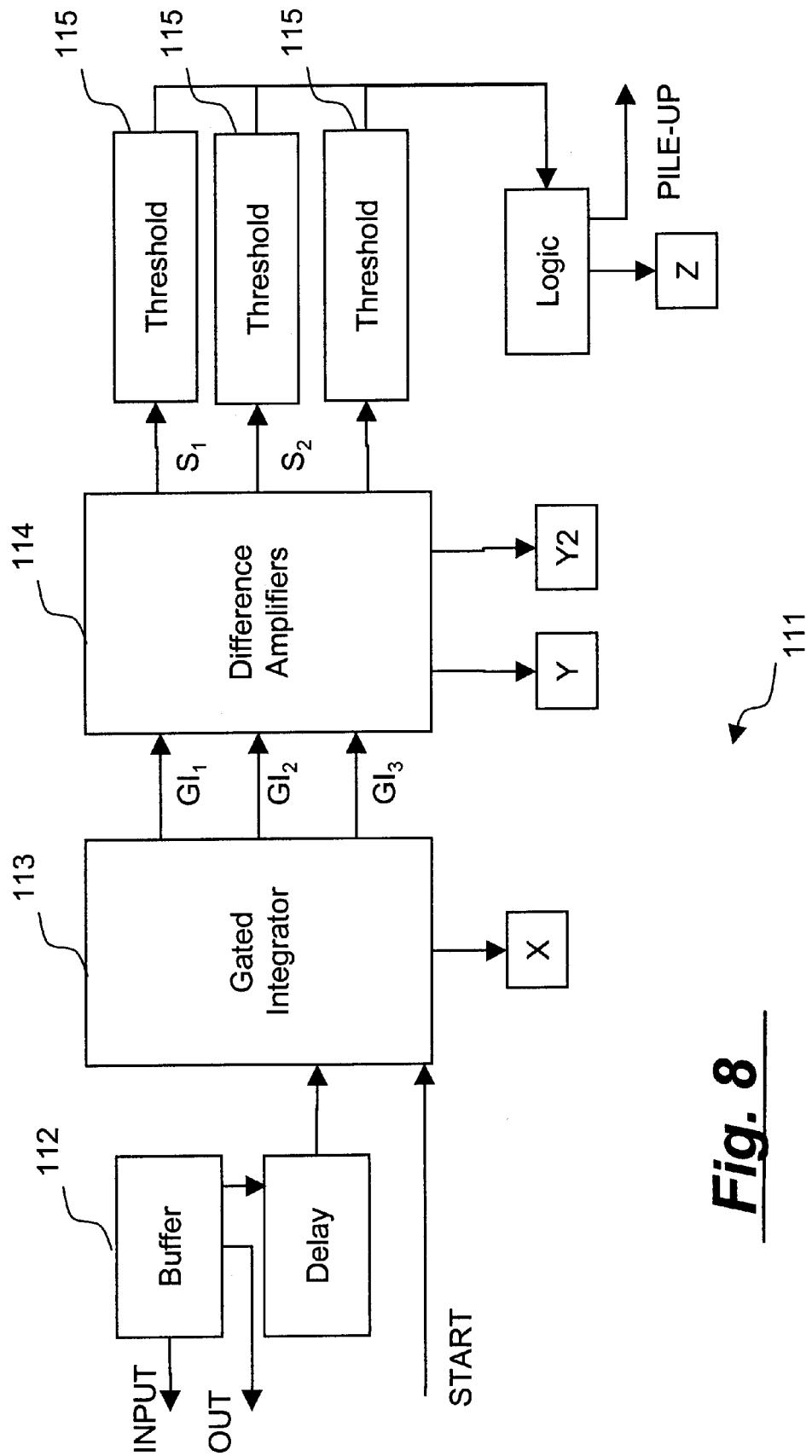
FIG. 8 is a block diagram of the pileup rejection circuit.
Figure 9:
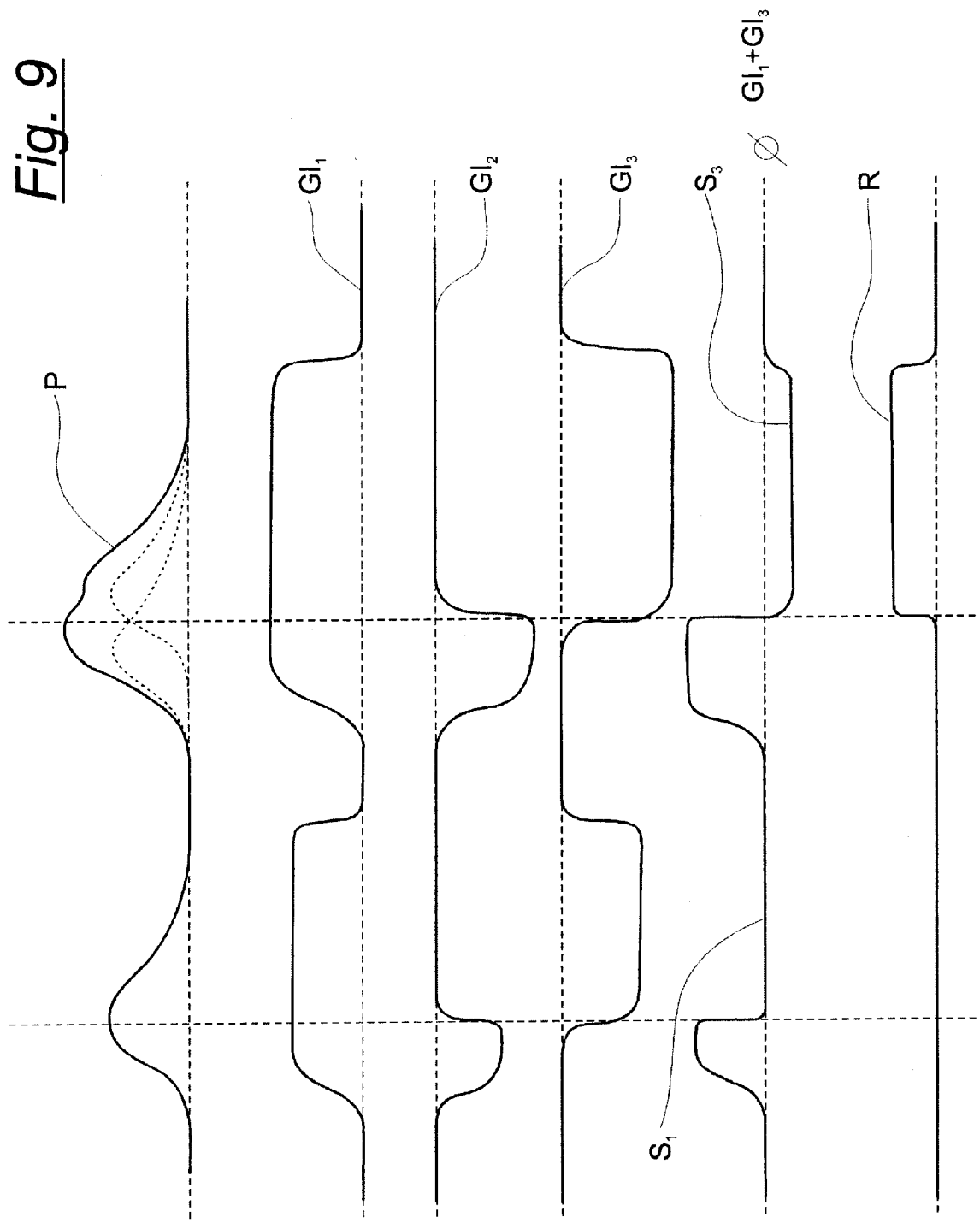
FIG. 9 illustrates the respective signals for a detector amplifier pulse, first and second gated integrator outputs, integrator difference, and pulse rejection output.

More specifically, having reference to FIGS. 8, 9, the pile-up rejection circuit 111 accepts an amplified pulse signal which is fed as an input to a buffer 112. The signal is delayed to compensate for a delay in a pulse analysis start signal from the CFD. The signal then enters an integrator 113 which determines two or more integrals of each examined pulse of the serial train of pulses. If the examined pulse is not of a normal shape (i.e. not Gaussian or other "normal" shape) then the pulse is rejected.

Effectively, the gated integrator 113 integrates each pulse over time; firstly; for the whole pulse $GI_1$ (between the beginning of the pulse to a time well past the pulse) and secondly for about one half of the pulse $GI_2$ (between well before the beginning of the pulse to the middle of the pulse). A third integral $GI_3$ represents the integral from the middle of the pulse to a time well past the end of the pulse. Comparison of the integrals of a portion of the pulse to the whole of the pulse is illustrative of distortion of the pulse. Difference Amplifier 114 performs the comparison of the different integrations.

Actually, the gate integrator performs one entire pulse integration and two portions are subdivided out of the overall integration to provide the pre and post integration portions $GI_2, GI_3$.

A calibration is obtained for an actual pulse which has not piled-up. This can be achieved by obtaining data at low count rates where the pulses are not piled up. The integrals from the first integration $GI_1$ and second integration $GI_2$ are of opposite sign. Summing of the two signals yields a differential S. Weighted differences for the two integrals $GI_1, GI_2$ can be applied and adjusted so that the weighted difference $S_1$ to an actual pulse will be zero for non-piled pulses. These adjustments to the weighting factors are made in the differential amplifier 114. This establishes a threshold 115 against which the difference in the integrations can be compared. Application of the differential amplifier and the weighting factors to a piled-up pulse yields an identifiable non-zero baseline $S_2$ which is distinguishable over threshold 115.

For an undistorted or non-piled-up pulse, the first integration (whole pulse) should be about twice the second integration (½ pulse for purely Gaussian-shaped pulse). Thus, for a Guassian-shaped pulse, the appropriate weighting factors would be about ½:1 to achieve a null difference signal. Weighting factors would be adjusted at the differential amplifier for various other pulse shapes.

Non-zero differences are detected at the thresholds 115. If the appropriate threshold is exceeded then the logic circuit is activated to reject the pulse. A non-zero difference between the first and second integrals are representative of pre-pile-up and between the first and third integrals are representative of post-pile-up.

Provision for inputs X,Y,Y2 to the gated integrator and the difference amplifier permit the timing of the integration and the weighting to be adjusted.

Pulses P which are piled-up due to spacing as close as 15 ns can be detected and rejected R.

Referring again to FIG. 7, an integrator 116 shapes an accepted pulse for analysis by a spectroscopy amplifier 117. The spectroscopy amplifier 117 prepares the pulse for analysis by a pulse height analyzer 118. Conventional pulse pile-up rejectors (built into the spectroscopy amplifier 118) are disabled.

The pulse height analyzer 118 determines which pulses are representative of nitrogen and outputs the count results to a computer 119.

For accurate energy determination, the overall system is calibrated prior to use. An energy calibration is performed on known materials to obtain a spectrum having lots of counts in distinct energy peaks as near as possible to the energy region of interest, i.e. 8.5–11 MeV. Secondly, a "background" spectrum is acquired—i.e. an energy spectrum with the TNA head sitting over an area known to be free of mines.

Knowing the background spectrum, the spectrum acquired for a target of interest is superimposed with the background and the difference compared against known pulse count rates for known nitrogen targets for establishing whether the target of interest is explosive or not.

Using a standard Gaussian detection limit approach described by Currie, L. A., Anal. Chem., 40, No. 3,586 (1968) to low-level counting, the false alarm and mine detection probabilities are based upon the number of excess counts in the energy region of interest. Under certain circumstances having large background fluctuations or abnormal structure in the background spectrum (such as excessive silicon in the soil, for example) the detection limit statistical approach can generate false positive indications of a mine. To improve upon the detection probability, a combined Gauss-Bayes statistical approach is employed as described by Silvia, D. S., Los Alamos Science, 19, 180 (pb 1990)

EXAMPLE I

Figure 10:
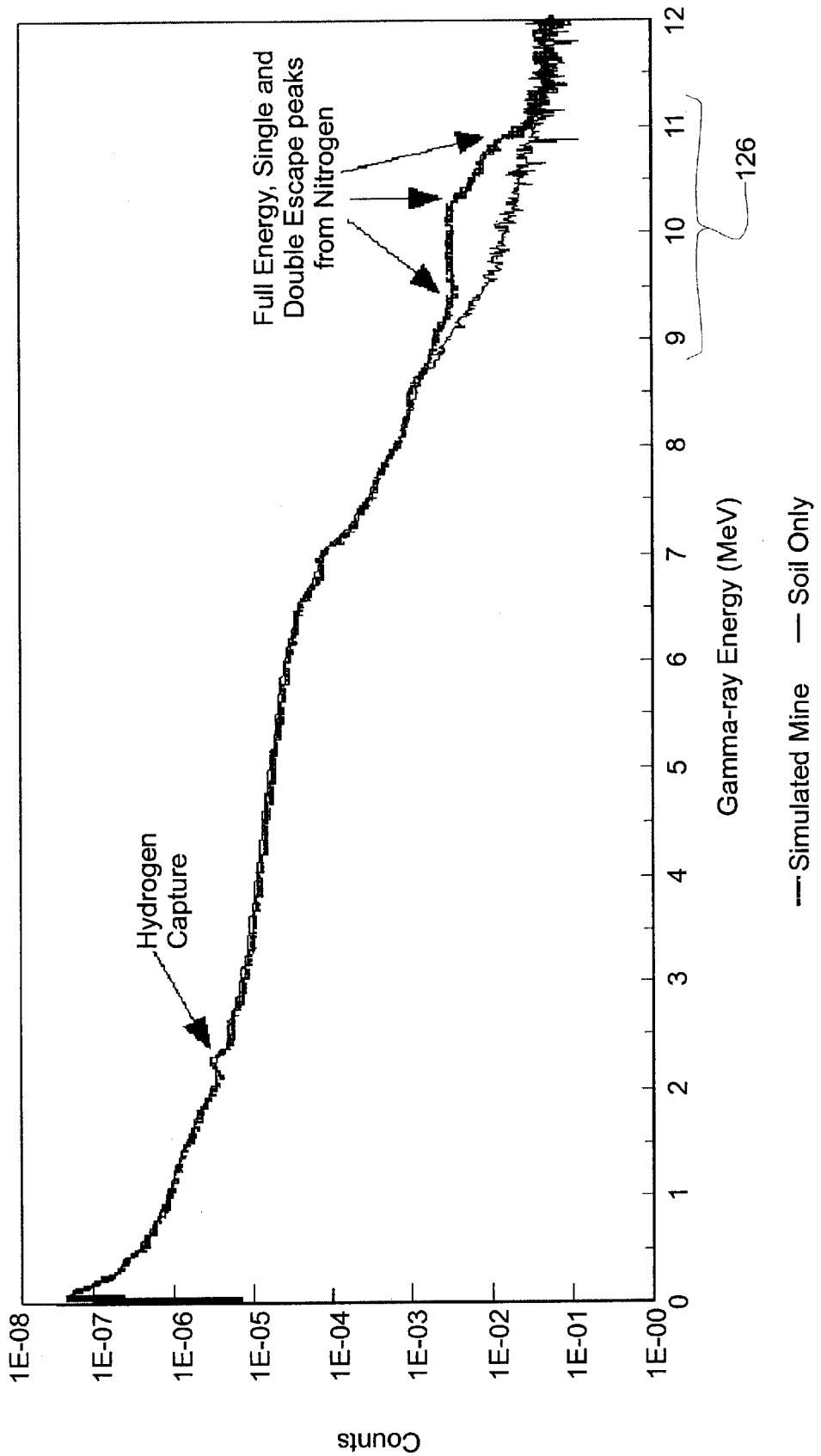
FIG. 10 is a graph illustrating gamma ray pulse counts versus gamma ray energy level (energy spectrum) for an experiment using a weak $^{252}$Cf source and one 2"×2" NaI(Tl) detector with a 1 kg N "mine", for an 8 hour run according the EXAMPLE III.
Figure 11:
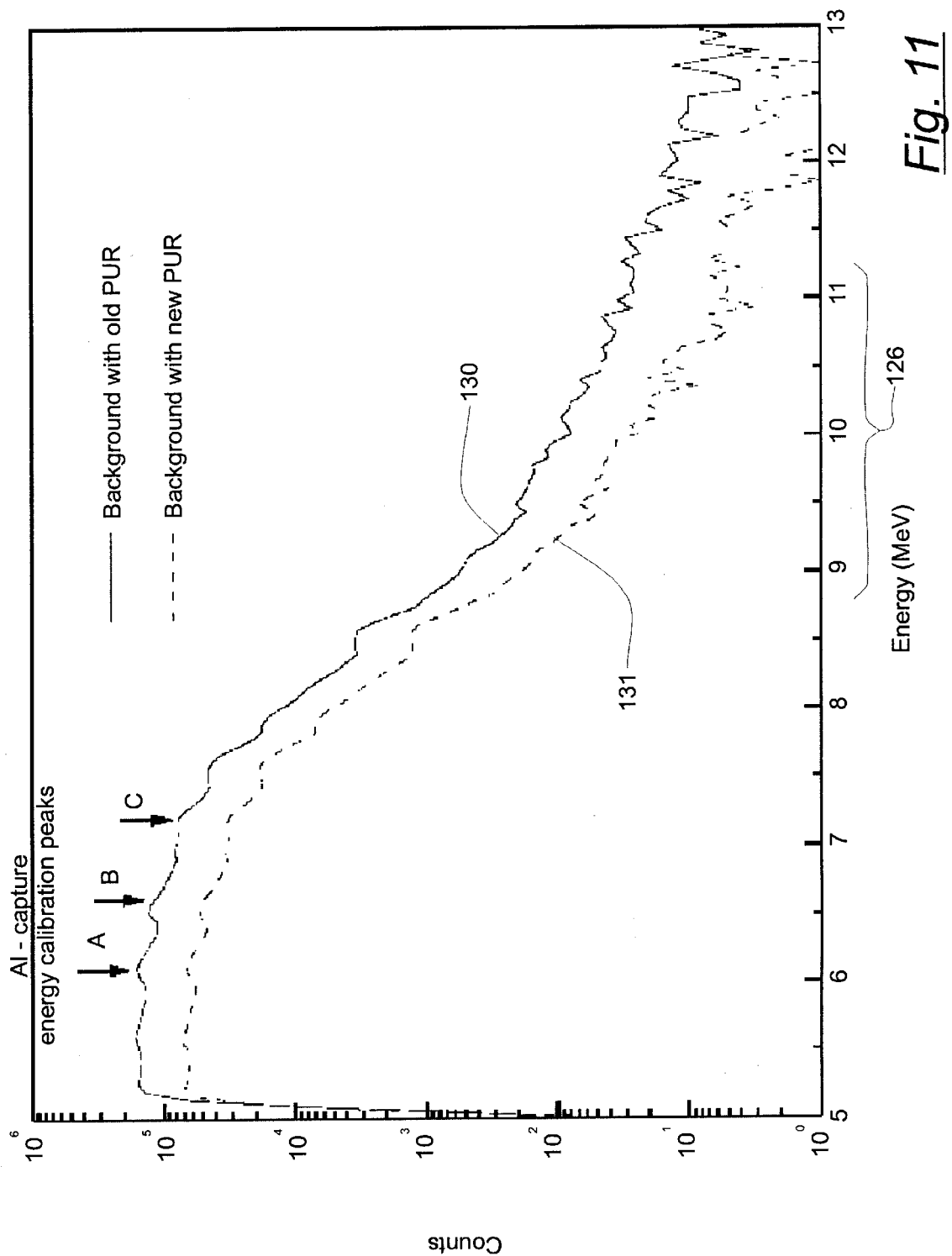
FIG. 11 is a graph illustrating the energy spectrum obtained using both a prior art pile-up rejection technique and the novel method. There is a large effect noted in the energy region of interest at roughly 9–11 MeV resulting from the change of methods to reject piled-up pulses.

Having reference to FIGS. 10, 11 for confirmation of the choice of transition energy for identifying $^{14}N$ and the use of NaI(Tl) detectors, experiments were performed using a weak $^{252}Cf$ source ($1\times10^6$ n/s) and a 2"×2" NaI(Tl) detector. An explosive simulant, containing 1 kg of nitrogen, was used. Positive detection of nitrogen reduces to the detection of a statistically significant number of counts above background in the energy region 126 of interest—roughly 9 to 11 MeV.

A large number of counts were required to obtain sufficient statistics at the desired energy. The count time for this experiment (about 8 hours) was excessive and clearly indicated the need for a stronger $^{252}Cf$ source and/or more efficient detectors in the final TNA system.

EXAMPLE II

Having reference to FIG. 6, the choice of shielding materials was based upon two considerations: firstly for shielding of the high efficiency NaI(Tl) detectors 105 from direct neutron and gamma-ray emanating from the $^{252}Cf$ source 103; and secondly as biological shielding for personnel.

The combination of lead and LiBr shielding and polyethylene moderating material used was optimized using computer code MCNP4A, as described by Briemeister, J. F. In "MCNP—A General Monte Carlo n-Particle Transport Code—Version 4", LA-12625-M, 1993. The final configuration of materials is as illustrated in FIG. 6.

This shielding configuration lowered the count rate at the NaI(Tl) detectors to about 200,000 cps. This rate was a baseline for the electronics design (FIGS. 7, 8). The main contributor to these counts are gamma-rays from the $^{252}$Cf source 103, however neutron capture gamma rays from a variety of sources, including the NaI(Tl) crystal itself, were found to contribute.

The flask 120 holding the source is substantially polyethylene 121. A lead shield 122 surrounds the source 103 with a source transfer tube 123 extending upwardly through the polyethylene 121. A lead shielding sphere 124 is centered in the flask 120 and located in the source transfer tube 123. A LiBr gel 125 surrounds the flask and absorbs neutrons to block their access to the NaI(Tl) detectors 105.

The measured radiation dose equivalent rates were 55 mRem/h neutron and 2.6 mRem/h gamma at the surface of the TNA head, and 1.8 mRem/h neutron and 0.8 mRem/h gamma at 1 m from the surface.

EXAMPLE III

The system and electronics were calibrated by obtaining a "background" spectrum with the TNA head sitting over an area known to be free of mines. As shown in FIG. 11, three peaks A, B, C, generated by neutron activation in Aluminum within the head, were prominent enough to be used for calibration—the full energy peak from the 6.103 MeV transition and the double and single escape peaks from the 7.726 MeV transition at 6.704 MeV and 7.215 MeV, respectively. A linear extrapolation of this least squares fit, into the energy region of interest, was then performed.

Two traces are shown; the top solid-line trace 130 representing the results based upon previous prior art pulse rejection technique of comparing pulse widths. The bottom dashed trace 131 represents the results based upon the gated integrator pulse pile-up rejection circuit 111 which demonstrates fewer pile-up pulses being counted as 10.8 MeV nitrogen emission pulses.

EXAMPLE IV

Field trials of the TNA sensor as a confirmatory sensor were held at specially prepared mine fields in Southern Alberta in winter conditions. Ambient temperatures were between −20° C. and <30° C., with winds up to 50 km/h and snow cover of over 30 cm.

Figure 12:
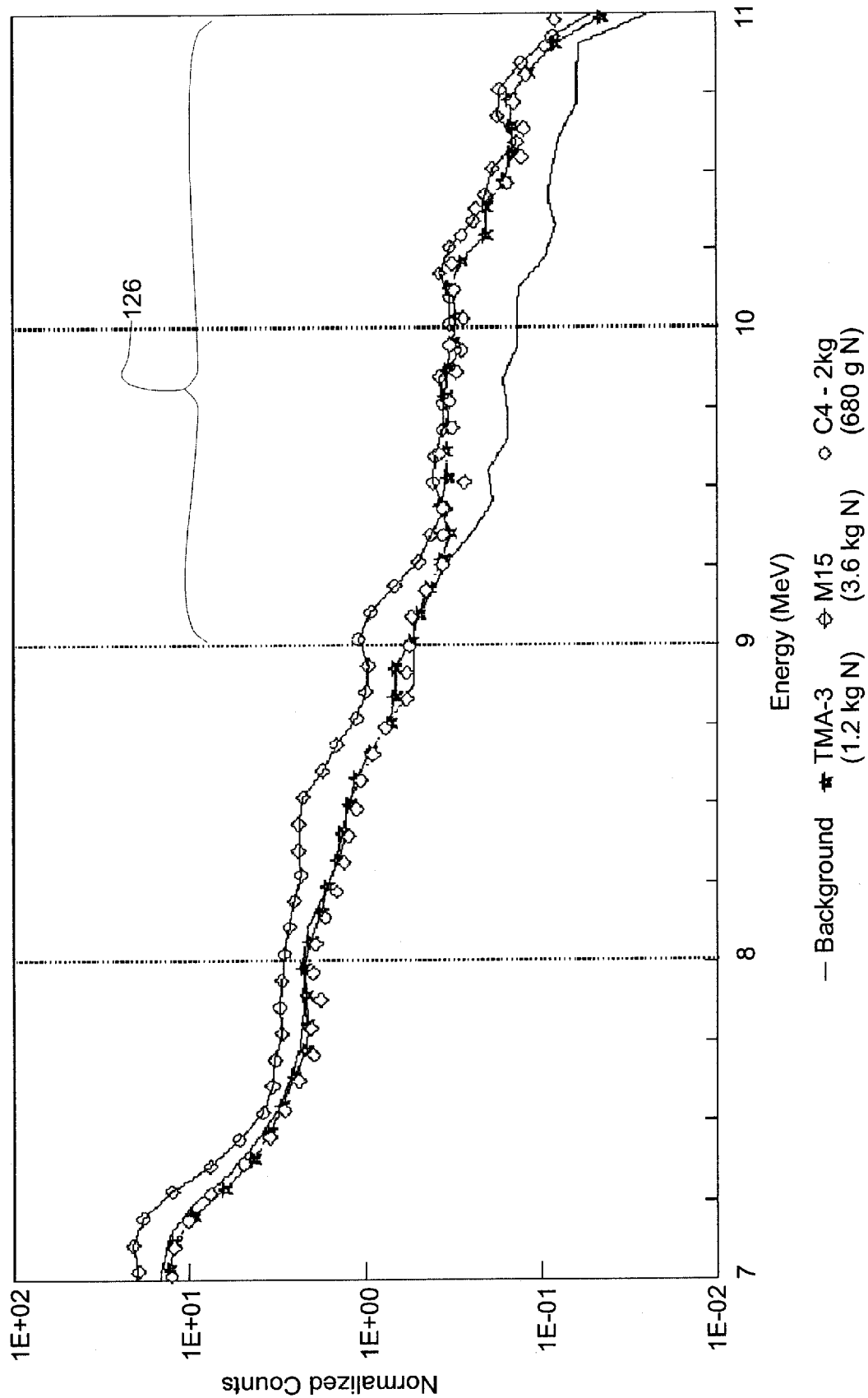
FIG. 12 is a graph illustrating the energy spectrum obtained for the field trials on "large" mines according to EXAMPLE IV. Each run was conducted for 10 minutes. Note the effect of the mines metallic shell on the spectrum for the M15 spectrum.
Figure 13:
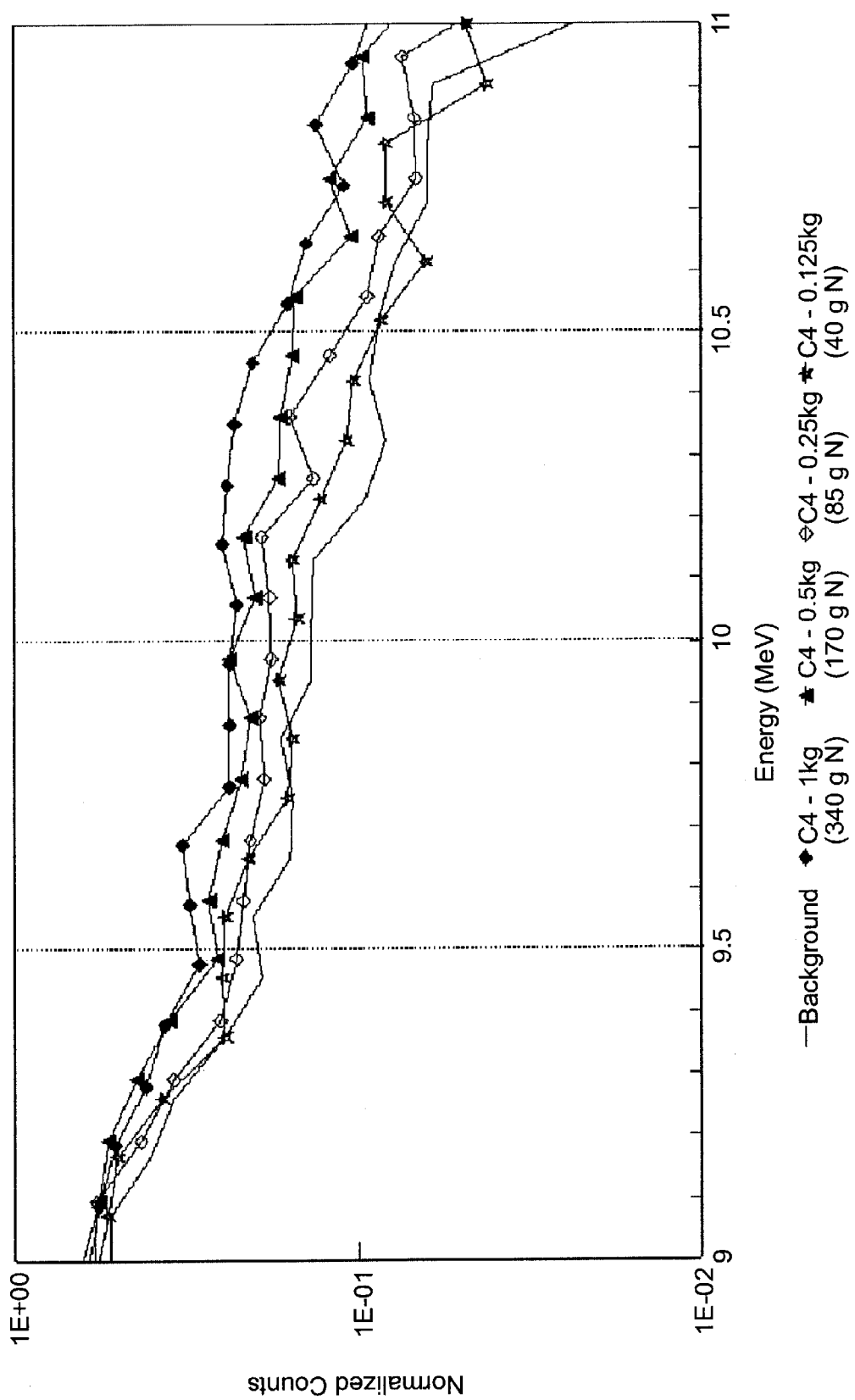
FIG. 13 is a graph illustrating the energy spectrum obtained for the field trials on "small" C4 mines according to EXAMPLE IV. Each run was conducted for 10 minutes. All the tested mines, except for the 0.125 kg C4 mine (having about 40 g of N) could be positively detected in less than 5 minutes.

During the trials, four "large" mines (M15, TMA3, M21 and TMA5A) representing different masses of nitrogen, were buried at different depths and interrogated. Additionally, different masses of "small" mines or C4 plastic explosive (34% N by mass) were surface-buried and interrogated. Spectral results for different explosives are illustrated in FIGS. 12 and 13. Table 1 summarizes the experimentally determined count time for a 93% detection probability. This count time was arrived at by an iterative solution to the statistical analysis techniques described above, based upon the experimentally measured background and net counting rates.

TABLE 1

Results of Detection Trials

| Mine | Nitrogen Mass (to top of mine) | Burial Depth | Count Time for Positive Detection (93%) (s) |
|---|---|---|---|
| Large Mines (Fig. 12) | | | |
| M15 | 3.6 kg | surface | 5 |
| M15 | 3.6 kg | 3" | 19 |
| TMA3 | 1.2 kg | surface | 6 |
| TMA3 | 1.2 kg | 3" | 11 |
| TMA3 | 1.2 kg | 6" | 37 |
| M21 | 1 kg | 3" | 31 |
| TMA5A | 870 g | 4" | 48 |
| Small Mines (Fig. 13) | | | |
| C4 | 680 g | surface | 8 |
| C4 | 680 g | 3" | 20 |
| C4 | 340 g | surface | 14 |
| C4 | 170 g | surface | 45 |
| C4 | 85 g | surface | 254 |
| C4 | 40 g | surface | >1000 |

Several features should be noted. Firstly, for the case of the largest Anti-Tank (AT) mine (M15) there is considerable structure below 9 MeV. This is likely due to neutron capture in other elements in the M15 mine—and the large peak at about 7.1 MeV may be the first escape from the prominent iron capture transition. This is supported by the fact that the M15 is encased in steel, while C4 and the other non-metallic mines are not. Secondly there is an indication of structure in the background around 10.1 MeV, which could be the first escape from the Si-capture peak mentioned earlier (the soil was quite sandy, and thus high in Si-content). Silicon activation will eventually determine the final lower detection limit of the system. Thirdly, from the table and the figures, the lower detection limit of the system as it stands right now is slightly under 100 g of nitrogen (for reasonable count times of less than 5 minutes). This means that the system is capable of detecting almost all AT mines (at depths down to 6") and many larger Anti-Personnel (AP) mines—which would be surface buried. Finally one notes that there is virtually no difference in the positive detection counting times for some of the mines examined here, despite their large differences in mass of N (500 g to 3.6 kg). This is due to a convolution of the thermal neutron flux profile (which drops rapidly with depth) and the distribution of nitrogen within the mines (for the physically larger M15, there is far more nitrogen at greater depths than for C4, for example).

Experiments were also conducted to determine the radial field of view of the system as shown in Table 2.

TABLE 2

Radial Variation in System Sensitivity (M15 Mine Surface Buried)

| Radial Distance of Mine to Source (cm) | Count Time for Positive Detection (93%) (s) |
|---|---|
| 0 | 5 |
| 10 (between detectors) | 4 |
| 20 (between detectors) | 9 |
| 30 (under detector) | 8 |
| 30 (between detectors) | 80 |
| 40 | >1000 |

The field of view is quite constant out to a radius of about 25 cm, after which it begins to drop rapidly. At a radius of about 40 cm, detection is not possible (this is physically outside of the 30 cm radius TNA head). The above serves to illustrate the importance of accurately locating the target of interest (mine) with the primary systems.

In summary, the EXAMPLES have validated use of a TNA sensor for confirmatory detection of land mines having nitrogen masses of greater than about 100 g in a few minutes, over a radial area of about 2000 $cm^2$ (about 25 cm radius). This will enable almost all AT and large AP mines to be positively detected. Smaller surface buried AP mines (containing less than 100 grams of nitrogen) will have to be eliminated by such techniques as flailing, as is performed by a pre-clearance vehicle. Further, the system has clearly shown the ability to perform in adverse weather conditions.

THE EMBODIMENTS OF THE INVENTION IN WHICH AN EXCLUSIVE PROPERTY OR PRIVILEGE IS CLAIMED ARE DEFINED AS FOLLOWS:

1. A method of high speed rejection of piled-up pulses in a train of piled-up pulses and normal pulses which are not piled-up, said train of pulses representing scintillation events comprising the steps of:

processing the pulse with an integrator for integrating substantially the entire pulse and establishing a first value indicative thereof;

processing the same pulse with an integrator for integrating a portion of the pulse and establishing second value indicative thereof;

establishing values of the difference between the first and second values;

comparing the difference against a pre-determined difference wherein variations therebetween are indicative of pulse which does not have the shape of a normal pulse; and rejecting pulses which do not have the predetermined shape of a normal pulse and thereby rejecting piled-up pulses.

2. The method as recited in claim 1 wherein the pre-determined difference is determined by:

processing a normal pulse with an integrator for integrating substantially the entire normal pulse and establishing a first value indicative thereof;

processing the normal pulse with an integrator for integrating a portion of the normal pulse and establishing second value indicative thereof; and establishing values of the difference between the first and second values wherein the value of the difference forms the predetermined difference.

3. The method as recited in claim 1 wherein the integrator is a gated integrator.

4. The method as recited in claim 2 wherein the integrator is a gated integrator.

5. A method of high speed rejection of piled-up pulses in a train of piled-up pulses and normal pulses which are not piled-up, said train of pulses representing scintillation events comprising the steps of:

integrating substantially the entire pulse and establishing a first value indicative thereof;

integrating a portion of the pulse and establishing second value indicative thereof;

establishing values of the difference between the first and second values;

comparing the difference against a pre-determined difference value wherein variations therebetween are indicative of pulse which does not have the shape of a normal pulse; and rejecting pulses which do not have the predetermined shape of a normal pulse and thereby rejecting piled-up pulses.

6. The method as recited in claim 5 wherein the pre-determined difference is determined by:

processing a normal pulse with an integrator for integrating substantially the entire normal pulse and establishing a first value indicative thereof;

processing the normal pulse with an integrator for integrating a portion of the normal pulse and establishing second value indicative thereof; and establishing values of the difference between the first and second values wherein the value of the difference forms the pre-determined difference.

7. The method as recited in claim 6 wherein the integrator is a gated integrator.

8. The method as recited in claim 7 wherein the integrator is a gated integrator.

9. A method of high speed rejection of piled-up pulses in a train of piled-up pulses and normal pulses which are not piled-up, said train of pulses representing scintillation events comprising the steps of:

integrating substantially the entire pulse;

selecting the entire integral and establishing a first value indicative thereof;

selecting a portion of the integral pulse and establishing second value indicative thereof;

establishing values of the difference between the first and second values;

comparing the difference against a pre-determined difference value wherein variations therebetween are indicative of pulse which does not have the shape of a normal pulse; and rejecting pulses which do not have the predetermined shape of a normal pulse and thereby rejecting piled-up pulses.

10. The method as recited in claim 9 further comprising, prior to comparing a pulse against the pre-determined difference, eliminating pulses from the train of pulses which have an energy below a pre-determined energy threshold, leaving only pulses from the train of pulses having a higher energy for subsequent comparative shape processing.

11. The method as recited in claim 10 wherein shape of the pulses are compared against a pre-determined shape of a normal pulse by:

processing a normal pulse with a gated integrator for integrating substantially the entire pulse and establishing a first value indicative thereof;

processing the same normal pulse with a gated integrator for integrating a portion of the pulse and establishing second value indicative thereof; and applying a weighting factor to the first and second values for the normal pulse so that difference between the first and second values yields zero;

processing the remaining high energy pulse with a gated integrator for integrating substantially the entire pulse and establishing a first value indicative thereof;

processing the same high energy pulse with a gated integrator for integrating a portion of the pulse and establishing second value indicative thereof;

applying the weighting factor to the first and second values for the high energy pulse wherein variation from zero is indicative of a pulse which does not have the normal shape.

12. The method as recited in claim 11 wherein shape of the pulses are compared against a pre-determined shape of a normal pulse by:

processing a normal pulse with a gated integrator for integrating substantially the entire pulse and establishing a first value indicative thereof;

processing the same normal pulse with a gated integrator for integrating a portion of the pulse and establishing second value indicative thereof; and applying a weighting factor to the first and second values for the normal pulse so that difference between the first and second values yields zero;

processing the pulse of interest with a gated integrator for integrating substantially the entire pulse and establishing a first value indicative thereof;

processing the same pulse with a gated integrator for integrating a portion of the pulse and establishing second value indicative thereof;

applying the weighting factor to the first and second values for the pulse of interest wherein variation from zero is indicative of pulse which does not have the normal shape.

* * * * *